(12) United States Patent
Wagner et al.

(10) Patent No.: US 8,056,618 B2
(45) Date of Patent: Nov. 15, 2011

(54) FLAPPER MOUNTED EQUALIZER VALVE FOR SUBSURFACE SAFETY VALVES

(75) Inventors: Alan N. Wagner, Broken Arrow, OK (US); Gary B. Lake, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 342 days.

(21) Appl. No.: 11/779,687

(22) Filed: Jul. 18, 2007

(65) Prior Publication Data

US 2009/0020291 A1   Jan. 22, 2009

(51) Int. Cl.
*E21B 34/06* (2006.01)
*E21B 34/16* (2006.01)

(52) U.S. Cl. ....... 166/57; 166/66.6; 166/324; 166/332.8

(58) Field of Classification Search ................... 166/57, 166/66.6, 324, 332.7, 332.8
See application file for complete search history.

(56) References Cited

U.S. PATENT DOCUMENTS

| | | | |
|---|---|---|---|
| 699,848 A * | 5/1902 | Preslar ........................... | 166/181 |
| 1,050,557 A * | 1/1913 | McLaughlin .................. | 166/182 |
| 1,639,079 A * | 8/1927 | Cushing ......................... | 166/192 |
| 3,015,469 A * | 1/1962 | Falk ................................. | 251/331 |
| 4,161,219 A | 7/1979 | Pringle | |
| 4,415,036 A | 11/1983 | Carmody et al. | |
| 4,475,599 A * | 10/1984 | Akkerman ..................... | 166/323 |
| 4,478,286 A | 10/1984 | Fineberg | |
| 4,619,320 A | 10/1986 | Adnyana et al. | |
| 4,660,714 A * | 4/1987 | Suzuki et al. ..................... | 206/6 |
| 4,669,547 A * | 6/1987 | Pringle ........................... | 166/321 |
| 5,119,861 A * | 6/1992 | Pino ................................ | 138/89 |
| 5,199,497 A | 4/1993 | Ross | |
| 6,053,992 A | 4/2000 | Wu et al. | |
| 6,079,497 A * | 6/2000 | Johnston et al. ............... | 166/324 |
| 6,296,061 B1 * | 10/2001 | Leismer ......................... | 166/386 |
| 6,433,991 B1 | 8/2002 | Deaton et al. | |
| 6,478,090 B2 | 11/2002 | Deaton | |
| 6,604,727 B1 | 8/2003 | Bachnak | |

(Continued)

FOREIGN PATENT DOCUMENTS

GB    2243188 A1    10/1991

(Continued)

OTHER PUBLICATIONS

Heijnen, W.H.P.M., et al., "Subsurface Safety Valve Developments for Gaswells", SPE 19283/1, Sep. 1989, 6 pages.

(Continued)

*Primary Examiner* — David Bagnell
*Assistant Examiner* — Robert E Fuller
(74) *Attorney, Agent, or Firm* — Steve Rosenblatt

(57) ABSTRACT

An equalizing valve for a flapper in a subsurface safety valve has a valve member disposed in a passage in the flapper that is made of a material that changes shape when subjected to a stimulus such as heat, for example. In one configuration, the valve member closes off the passage and in another flow past or through the valve member defines the open position allowing pressure to equalize across the closed flapper. Other valve applications are envisioned for downhole use. The stimulus can come from applied electrical current that causes sufficient heating to have the valve member alter its shape. Mechanical assists to the shape altering can be provided which can also optionally be made of shape changing materials. Biasing into a sealed position is envisioned.

19 Claims, 2 Drawing Sheets

U.S. PATENT DOCUMENTS

| | | | |
|---|---|---|---|
| 6,619,388 B2 | 9/2003 | Dietz et al. | |
| 6,644,408 B2 | 11/2003 | Ives | |
| 6,840,257 B2 | 1/2005 | Dario et al. | |
| 6,851,477 B2 | 2/2005 | Hill, Jr. et al. | |
| 6,983,803 B2 * | 1/2006 | Watson et al. | 166/374 |
| 7,032,675 B2 | 4/2006 | Steele et al. | |
| 7,055,793 B2 | 6/2006 | Biehl et al. | |
| 7,204,313 B2 | 4/2007 | Williams et al. | |
| 2005/0092484 A1 | 5/2005 | Evans | |
| 2005/0178988 A1 | 8/2005 | Biehl et al. | |
| 2006/0048936 A1 * | 3/2006 | Fripp et al. | 166/244.1 |
| 2006/0151177 A1 | 7/2006 | Williams et al. | |

FOREIGN PATENT DOCUMENTS

| | | |
|---|---|---|
| GB | 2370298 A | 6/2002 |
| GB | 2371578 A | 7/2002 |
| GB | 2417546 A | 1/2006 |
| WO | 9502143 | 1/1995 |
| WO | 0157358 A1 | 8/2001 |
| WO | 03036019 A1 | 5/2003 |
| WO | 2004018833 A1 | 3/2004 |
| WO | 2006028691 A1 | 3/2006 |

OTHER PUBLICATIONS

Going, W.S., et al., "Safety Valve Technology for the 1990's", SPE 18393, Oct. 1988, 545-552.

Medley, Edward L., "Experience with Surface Controlled Sub-Surface Safety Valves", SPE 8068, 1978, 6 pages.

Gresham, J.S., et al., "Development of a Deepset Electric Solenoid Subsurface Safety Valve System", SPE14004, date unknown, 14 pages.

Dines, C.A., et al., "Considerations relative to the selection of sub-surface safety valves—a guide to the options", SPE 8162, 1979, 8 pages.

* cited by examiner

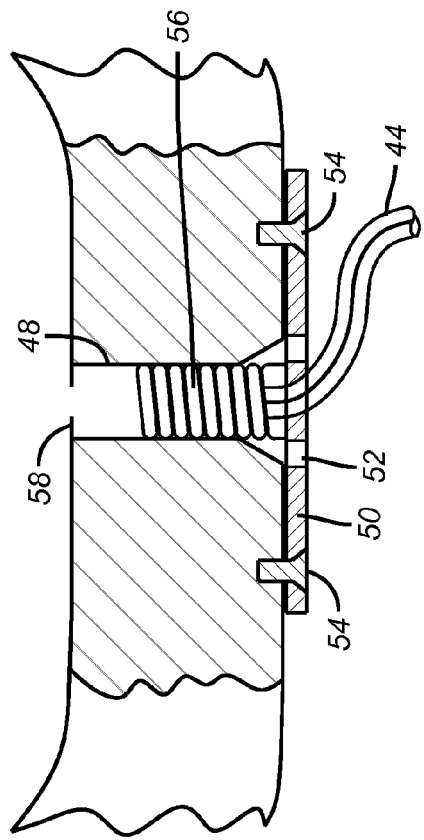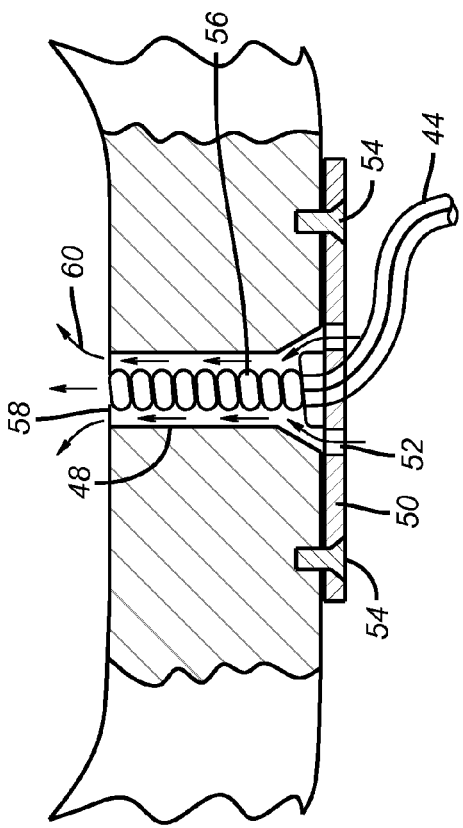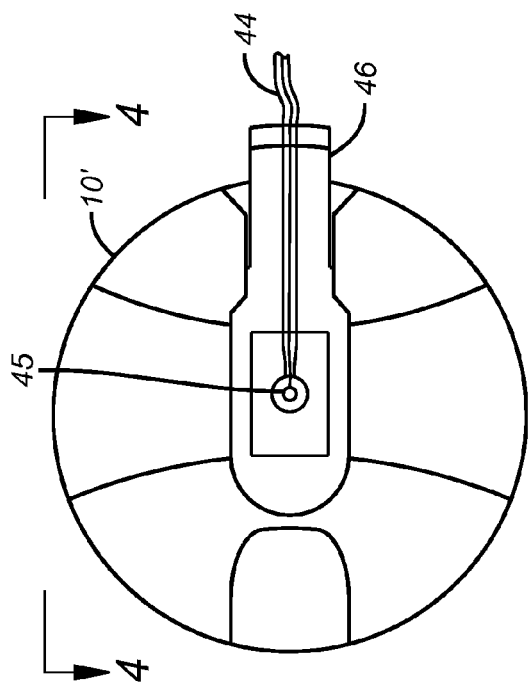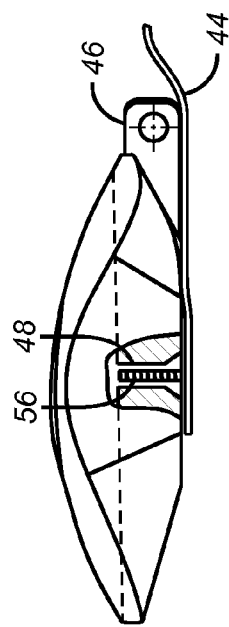

FLAPPER MOUNTED EQUALIZER VALVE FOR SUBSURFACE SAFETY VALVES

FIELD OF THE INVENTION

The field of the invention is valves where the valve member changes shape defining an open and a closed position and more particularly where the valve is mounted in a flapper, flapper seat or housing of a subsurface safety valve to equalize pressure across the flapper prior to moving it from a closed position with differential pressure across it.

BACKGROUND OF THE INVENTION

Subsurface safety valves are used in wells for emergency shutoff. Typically they are a part of the tubing string and are operated by a hydraulic system at the surface that provides pressure to a control line that runs from the surface to the valve housing. The valve housing connection communicates with an operating piston that is connected to a flow tube. A flapper is biased toward a seat (schematically illustrated as 31 in FIG. 1) by a torsion spring on the flapper pivot shaft. The movement of the flow tube under pressure delivered through the control line which moves the operating piston connected to it results in pivoting the flapper behind the flow tube. This defines the valve open position. The valve closed position has the flow tube moved up under the force of a spring when pressure in the control line is removed.

When the flapper is closed, a large pressure differential can build up across it. The need to equalize that pressure across the flapper before trying to move the flapper off the seat has been recognized and equalizer valves in the flapper have been in use for some time. One early example of this concept is U.S. Pat. No. 4,478,286. Later examples are U.S. Pat. Nos. 6,644,408 and 7,204,313.

Shape memory alloys (SMA) and materials that assume their original dimensions in response to a stimulus have been used as actuating members to move the ultimate valve member between open and closed positions. Some examples of this design can be seen in U.S. Pat. Nos. 5,199,497; 6,840,257 and 7,055,793.

Prior subsurface safety valve designs mentioned above have used the flow tube to actuate the equalizer valve. There has generally been enough power to do this with operating pistons that are driven hydraulically from the surface through a control line. More recently electrically operated subsurface safety valves are being developed where there are concerns about generating enough force to displace an equalizer valve with the flow tube. The present invention addresses this issue with a valve member made of SMA or another material that can seal a flapper passage in the run in configuration and can be triggered to assume a different shape that allows equalization of pressure. The operation is envisioned to be independent of a flow tube. Some of the designs being developed may not even use a flow tube. These and other aspects of the present invention will be more apparent to those skilled in the art from a review of the description of the preferred embodiment and the associated drawings with the understanding that the claims determine the full scope of the invention.

SUMMARY OF THE INVENTION

An equalizing valve for a flapper in a subsurface safety valve has a valve member disposed in a passage in the flapper that is made of a material that changes shape when subjected to a stimulus such as heat, for example. In one configuration, the valve member closes off the passage and in another flow past or through the valve member defines the open position allowing pressure to equalize across the closed flapper. Other valve applications are envisioned for downhole use. The stimulus can come from applied electrical current that causes sufficient heating to have the valve member alter its shape. Mechanical assists to the shape altering can be provided which can also optionally be made of shape changing materials. Biasing into a sealed position is envisioned.

BRIEF DESCRIPTION OF THE DRAWINGS

FIG. 3 is a bottom view looking uphole at a flapper showing wires going to the valve member located in the center of the flapper;

FIG. 4 is the view along lines 4-4 of FIG. 3;

FIG. 5 is a section view of another embodiment of the equalizer valve extending through the flapper and in a closed position;

FIG. 6 is the view of FIG. 5 with the valve in the open position.

DETAILED DESCRIPTION OF THE PREFERRED EMBODIMENT

Figure 1:
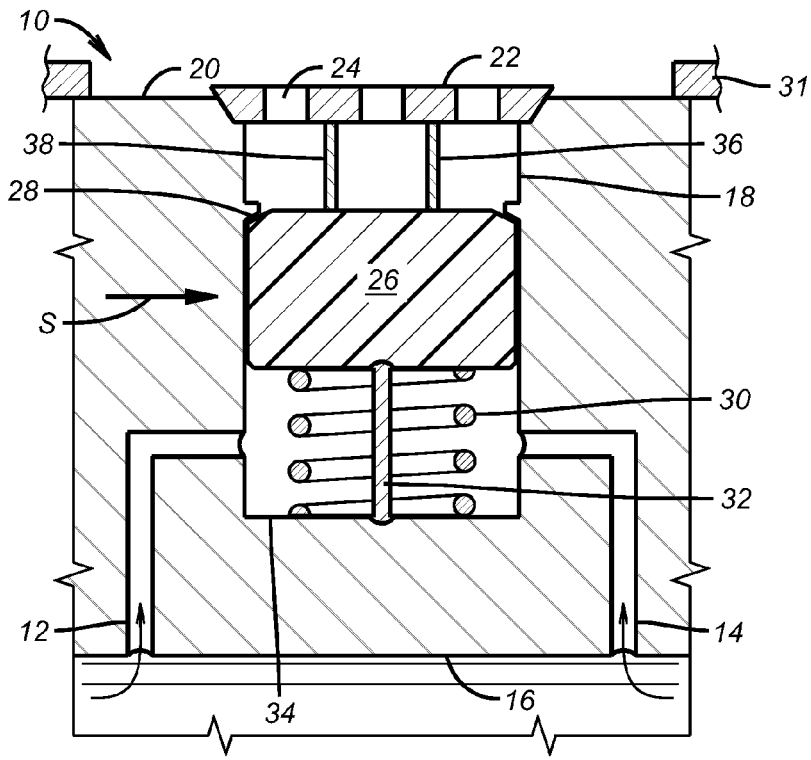
FIG. 1 is a section view through a flapper showing an assembly that can also alternatively be placed in the associated flapper seat showing one form of the equalizer valve in a closed position.
Figure 2:
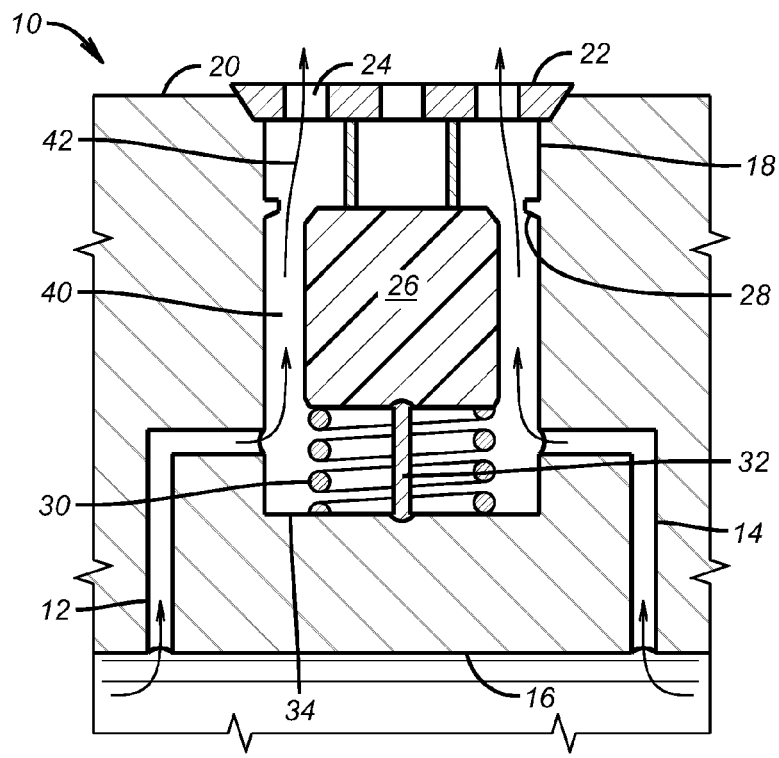
FIG. 2 is the view of FIG. 1 with the valve in the open position.

FIG. 1 is a section through a flapper 10 showing inlets 12 and 14 coming in to the bottom side 16. Any number of inlets can be used. Inlets 12 and 14 communicate with passage 18 that terminates at top surface 20 of flapper 10. A cap 22 has one or more openings 24. A valve member 26 is biased against a seat 28 by a spring 30. An elongated member 32 secures the valve member 26 to base surface 34. Elongated members 36 and 38 connect cap 22 to valve member 26. In the FIG. 1 position the members 36 and 38 may be in tension or under no net internal force. The spring 30 pushes the valve member 26 against seat 28 while member 32 is preferably in tension or under no net internal force. Members 32, 36 and 38 are preferably made of a material that will shorten when subjected to a stimulus S such as magnetically or electrically generated heat shown schematically in FIG. 1. As a result the valve member 26 is pulled in opposite directions as shown in FIG. 2 leaving an annular gap 40 while pulling the valve member 26 away from seat 28. In the preferred embodiment members 36 and 38 can retain their dimension in response to stimulus S while member 32 shrinks to elongate the valve member 26 and create passage 40 to allow equalizing flow 42 to occur. Valve member can be a resilient material compatible with well conditions and malleable enough to properly deform when subjected to a tensile force delivered from member 32. One example may be rubber. Another example is a metal that is ductile and highly elastic. When this happens the spring 30 is further compressed. When the stimulus S is removed, the parts resume the FIG. 1 position.

The preferred embodiment is shown in FIGS. 3-6. FIG. 3 is a bottom view of a flapper 10' showing electrical leads 44 coming toward its center 45 from the region of the pivot 46. FIG. 4 is a horizontal view of the flapper 10' showing a passage 48 going through it. FIG. 5 is a close up view of the view of FIG. 4. Referring to FIG. 5 a retainer plate 50 has one or more holes 52 and is secured to the flapper 10' by fasteners 54. The valve member 56 accepts the leads 44 in a manner that transmits heat to the valve member 56 when power is supplied to leads 44. The leads 44 can extend internally of the valve member 56 or can be secured to at least some portion of its exterior surface. The valve member 56 is preferably formed of a shape memory alloy so that it can be inserted into passage 48 and close it off to differential pressures from the downhole side of the flapper. Preferably, an interference fit on makeup is obtained in passage 48. A retainer 58 allows flow but holds back the valve member 56 when its dimensions change in response to power applied to leads 44. As shown in FIG. 6 the valve member 56 is reduced in diameter and increased in length to allow equalizing flow 60 to get past it. In essence, the material that changes shape under a stimulus is the valve member.

Those skilled in the art will appreciate that an equalizing valve design for a flapper is operational without contact from a flow tube and can be used in designs that don't even have a flow tube to actuate the flapper. Alternative designs for flapper equalizer valves are presented. In one variation, the valve member is actuated by dimensional changes of an attached component upon delivery of a stimulus to the attached component. That stimulus can be in the form of heat or other types of energy. Heat can be provided from an on board battery linked to wires to generate heat from current where the battery can be wirelessly actuated to power the wires from the surface. The attached members can be shape memory alloys or other shape recovering or altering materials such as magnetic SMAs, piezoelectric materials, magnetostrictive materials, electro adaptive polymers or paraffins. The valve member in that embodiment can be a resilient material such as an elastomer or other materials such as non-elastomeric ductile metals. In the preferred embodiment the valve member itself alters its shape in response to a stimulus and equalizes flow. The design has many downhole applications apart from a flapper equalizer valve and can be used for other valve applications downhole or in control circuits to redirect flow or other applications. The dimension changing member can be a shape memory alloy or one of the selections described above.

The above description is illustrative of the preferred embodiment and many modifications may be made by those skilled in the art without departing from the invention whose scope is to be determined from the literal and equivalent scope of the claims below.

We claim:

1. A tool for use in a subterranean location, comprising:
a housing having a passage therethrough with a seat to accept a flapper to close off the passage when said flapper is on said seat;
a pressure equalizing valve for said flapper and mounted in a pathway through said flapper or said seat further comprising a movable valve member that selectively seals said pathway by changing its overall peripheral shape, said shape changing selectively controllable from a remote location from said housing.

2. The valve of claim 1, wherein:
said shape change occurs in response to an applied stimulus.

3. The valve of claim 2, wherein:
said stimulus is heat.

4. The valve of claim 3, wherein:
said heat is electrically or magnetically generated.

5. The valve of claim 4, wherein:
said heat is created by wire running to said valve member from a pivot mounting of said flapper.

6. The valve of claim 5, wherein:
said wire is connected to a power source on said housing that is wirelessly engaged to provide power to said wire to generate heat.

7. The valve of claim 1, wherein:
said valve member is a shape memory alloy.

8. The valve of claim 1, further comprising:
a retainer to hold said valve member in said pathway when it changes dimension to allow equalizing flow through said pathway.

9. A downhole tool for use in a wellbore, comprising:
a housing having a passage therethrough with a seat to accept a flapper to close off the passage when said flapper is on said seat;
a pressure equalizing valve for said flapper and mounted in a pathway through said flapper or said seat further comprising a movable valve member that selectively seals said pathway by changing its overall peripheral shape;
said shape change occurs as a result of application of force to said valve member.

10. The valve of claim 9, further comprising:
at least one shape changing member connected to said valve member to exert a force on said valve member when said shape changing member changes dimension.

11. The valve of claim 10, wherein:
said shape changing member changes shape in response to an applied stimulus.

12. The valve of claim 11, wherein:
said stimulus is heat and said shape changing member is a shape memory alloy.

13. The valve of claim 12, wherein:
said valve member is biased against a seat in said pathway and said bias is overcome by a dimension change of said shape changing member.

14. The valve of claim 13, wherein:
said valve member comprises a resilient material secured on a side opposite from where said shape changing member is connected so as to place said valve member in tension when said shape changing member decreases in length.

15. A valve for subterranean use in a tubular string, comprising:
a body having a passage therethrough said body mounted in the tubular string;
a movable valve member in said passage and supported by said body on a support assembly to selectively open said passage by changing the overall peripheral shape of said movable valve member in response to a tensile force from said support assembly produced by the presence of a fluid in said passage and seal said passage by a reduction of said tensile force.

16. The valve of claim 15, wherein:
said valve member changes shape in response to a non-mechanical stimulus applied to said support assembly.

17. The valve of claim 15, wherein:
said body comprises a flapper in a subsurface safety valve.

18. A valve for subterranean use, comprising:
a body having a passage therethrough;
a movable valve member in said passage and supported by said body on a support assembly to selectively open said passage by changing the overall peripheral shape of said movable valve member in response to a tensile force from said support assembly and seal said passage by a reduction of said tensile force;
said valve member changes shape in response to a non-mechanical stimulus applied to said support assembly;
said stimulus is heat.

19. A valve for subterranean use, comprising:
a body having a passage therethrough;
a movable valve member in said passage and supported by said body on a support assembly to selectively open said passage by changing the overall peripheral shape of said movable valve member in response to a tensile force from said support assembly and seal said passage by a reduction of said tensile force;
said body comprises a flapper in a subsurface safety valve.

* * * * *